United States Patent Office 3,055,433
Patented Sept. 25, 1962

3,055,433
EPOXY-RESIN ENTERIC COATED TABLET AND COMPOSITION
Robert Hiltpold, Basel, Willy Fisch, Binningen, and Peter Speiser, Neuewelt, near Basel, Switzerland, assignors to Ciba Limited, Basel, Switzerland, a Swiss firm
No Drawing. Filed Aug. 19, 1958, Ser. No. 755,872
Claims priority, application Switzerland Aug. 28, 1957
15 Claims. (Cl. 167—82)

This invention provides new addition products that yield highly viscous solutions, and are addition products of epoxy-compounds and amines.

These addition products are made by reacting an epoxy-compound, which contains substantially two epoxide groups per mol, with a saturated aliphatic primary monamine which contains at least two hydroxyl groups, using

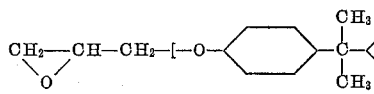

1.1 to 1.5 mols of the amine per mol of the epoxy-compound.

The requirement that 1.1 to 1.5 mols of the amine are used per mol of the diepoxy-compound means that for each equivalent of epoxide groups 1.1 to 1.5 equivalents of N-bound active hydrogen atoms are present.

As starting compounds that contain epoxide groups there may be mentioned, for example, epoxidated diolefins, diene or cyclic dienes, such as 1:2:5:6-diepoxy-hexane and 1:2:4:5-diepoxy-cyclohexane; epoxidated diolefinically unsaturated carboxylic acid esters, such as methyl-9:10:12:13-diepoxy-stearate; the dimethyl ester of 6:7:10:11-diepoxy-hexadecane - 1:16 - dicarboxylic acid; epoxidated compounds containing two cyclohexenyl radicals, such as diethylene glycol bis-(3:4-epoxy-cyclohexane carboxylic) and 3:4-epoxy-cyclohexyl-methyl 3:4-epoxy-cyclohexane carboxylate. There may also be mentioned, for example, polyesters containing two epoxide groups, such as are obtainable by reacting a dicarboxylic acid with epichlorhydrin or dichlorhydrin in the presence of an alkali. Such polyesters may be derived from aliphatic dicarboxylic acids, such as oxalic acid, succinic acid, glutaric acid, adipic acid, pimelic acid, suberic acid, azelaic acid or sebacic acid, and especially from aromatic dicarboxylic acids, such as phthalic acid, isophthalic acid, terephthalic acid, 2:6-naphthalene-dicarboxylic acid, diphenyl-ortho:ortho'-dicarboxylic acid, ethylene glycol bis-(para-carboxy-phenyl) ether and the like. There may be mentioned, for example, diglycidyl adipate and diglycidyl phthalate. There are preferably used diglycidyl esters that correspond substantially to the formula

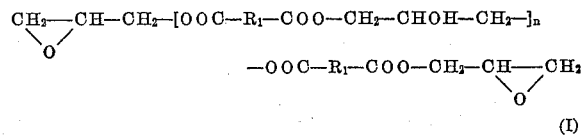

(I)

in which $R_1$ represents an aromatic hydrocarbon radical, and $n$ is 0 or a small number, and especially 0 to 2.

There may also be mentioned polyethers containing two epoxide groups, such as are obtainable by etherifying a dihydric alcohol or diphenol with epichlorhydrin or dichlorhydrin in the presence of an alkali. These compounds may be derived from glycols, such as ethylene glycol, diethylene glycol, triethylene glycol, propylene glycol-(1:2), propylene glycol-(1:3), butylene glycol-(1:4), pentane-1:5'-diol, hexane-1:6-diol and especially from diphenols, such as resorcinol, pyrocatechol, hydroquinone, 1:4 - dihydroxy - naphthalene, bis - (4 - hydroxyphenyl)-methane, bis-(4-hydroxyphenyl)-methyl - phenyl-methane, bis-(4-hydroxyphenyl)-tolyl-methane, 4:4' - dihydroxy-diphenyl, bis - (4 - hydroxyphenyl) - sulfone and especially 2:2-bis-(4 - hydroxyphenyl) - propane. There may also be mentioned ethylene glycol diglycidyl ether and resorcinol diglycidyl ether. There are preferably used diglycidyl ethers that substantially correspond to the formula

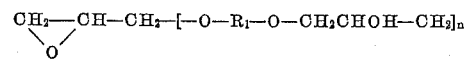

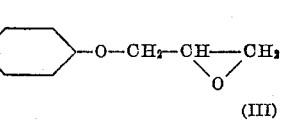

(II)

in which R, and $n$ have the meanings given with reference to the Formula I.

Especially desirable as starting compounds are diglycidyl ethers that substantially correspond to the formula (III)

in which $n$ has the average value 0 to 2, and especially 0 to 0.5.

The primary monamines correspond more especially to the formula $R_1$—$NH_2$, which $R_1$ represents an alkyl group containing at least 3 and advantageously not more than 6 carbon atoms and substituted by at least 2 hydroxyl groups.

There may be mentioned, for example, 3-amino-propane-1:2-diol, 2-amino-propane-1:3-diol, 4-amino-butane-1:2:diol, 4-amino-butane-1:3-diol, 2-amino-butane - 1:4-diol, 1-amino-butane-2:3-diol and 2-amino - butane - 1:3-diol. There are preferably used amines of the formula

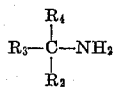

in which $R_2$ and $R_3$ represent hydroxyalkyl groups containing 1 or 2 carbon atoms, and $R_4$ represents an alkyl group containing 1 or 2 carbon atoms or a group as defined for $R_2$ and $R_3$. There may be mentioned 2-amino-2-methyl-propane-1:3-diol, tris-(hydroxymethyl) - aminomethane and especially 2-amino-2-ethyl-propane-1:3-diol.

The new addition products of this invention can be made by simple intimate mixing of the starting compounds in the aforesaid molar ratios of epoxy-compound to amine at room temperature and preheating the mixture, for example, to 70° C. There are advantageously used 1.1 to 1.25 mols of the amine per mol of epoxy-compound. A strongly exothermic reaction takes place (the maximum temperature being about 170° C. to 230° C.), and it is probable that linear polyaddition products are formed.

The reaction products, after being cooled, are more or less friable resins which can be granulated. They are distinguished by their good solubility in numerous solvent mixtures. In aqueous acetic acid, preferably containing 1 part by weight of glacial acetic acid and about 3 to 14 parts by weight of water, there are obtained at a resin content of 20% very highly viscous clear solutions having a viscosity, for example, exceeding 4000 centipoises, and from which the resin can be precipitated by the addition of an alkali. Such solutions are useful as binding agents for printing pastes.

Furthermore, certain mixtures of organic solvents containing alcohol, such as a mixture of ethanol and ethylene chloride, ethanol and methylene chloride, ethanol and ethyl acetate and especially ethanol and chloroform (advantageously in the ratio by weight of 1:1), possess a very good solvent power for the new addition products. In this manner solutions of up to 60% strength having a viscosity exceeding 10,000 centipoises can be obtained.

Such solutions are useful, owing to the insensitivity to water and the good solubility of the addition products of the invention in artificial gastric juice, for making forms of medicaments that are insensitive to water or moisture, such as tablets and pills, for oral administration.

The solutions are especially suitable as lacquers for coating pills, for example, for dragées resistant to tropical climate and also as granulating liquids in tabletting.

The following examples illustrate the invention, the percentages being by weight:

*Example 1*

78 grams of the epoxy-compound which is liquid at room temperature and has substantially the average formula

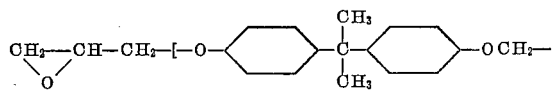 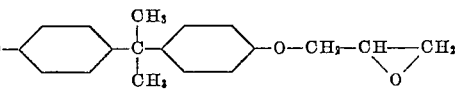

(epoxide content=5.1 epoxide equivalents per kilogram) are intimately mixed at room temperature with 29.8 grams of 2-amino-2-ethyl-1:3-propane-diol (molar ratio of epoxide compound to amine=4.5). The mixture is preheated to about 70° C., and then the temperature rises spontaneously in the course of about one minute to about 170° C. The mixture is maintained at the optimum temperature for 30 minutes. Upon cooling the mixture to room temperature, there is obtained a thermoplastic resin. When the resin is dissolved in a mixture of ethanol and chloroform (1:1 by weight) there can be obtained solutions of very high viscosities (exceeding 10,000 centipoises) at a resin content of 60%. For making highly viscous solutions other organic solvent mixtures containing alcohol can be used, such as a mixture of ethanol and ethylene chloride, ethanol and methylene chloride, ethanol and ethyl acetate or ethanol and acetone.

*Example 2*

In a manner analogous to that described in Example 1, 78 grams of the same epoxy-compound are reacted with 62.8 grams of 2-amino-2-ethyl-1:3-propane-diol (molar ratio of epoxy-compound to amine=8:9). There is obtained a resin of which a solution of 20% strength in aqueous acetic acid of 7% strength is a clear highly viscous solution (exceeding 4,000 centipoises), from which the resin can be precipitated by an alkali.

*Example 3*

By reacting, in a manner analogous to that described in Example 1, 78 grams of the same epoxy-compound with 26.3 grams of 2-amino-2-methyl-1:3-propane-diol (molar ratio of epoxy-compound to amine=4:5), there is obtained a thermoplastic resin of which a solution of 60% strength in a mixture of ethanol and chloroform (1:1 by weight) has a viscosity exceeding 4,000 centipoises.

*Example 4*

312 grams of the epoxy-compound described in Example 1 are reacted in a manner analogous to that described in that example with 109 grams of tris-(hydroxymethyl)-amino-methane (molar ratio of epoxy-compound to amine=8:9). There is obtained a resin of which a solution of 20% strength in aqueous acetic acid of 7% strength is a clear solution having a viscosity exceeding 30,000 centipoises.

A solution of the resin of 60% strength in a mixture of methanol and chloroform (1:1 by weight) is clear and has a viscosity exceeding 26,000 centipoises.

By changing the molar ratio of the starting compounds so that the molar ratio of epoxy-compound to amine is 4:5 or 2:3, there are obtained resins of which solutions of 60% strength in a mixture of ethanol and chloroform (1:1 by weight) have a viscosity exceeding 30,000 or 5,000 centipoises, respectively.

*Example 5*

40.8 grams of a condensation product of hydroquinone and epichlorhydrin consisting essentially of hydroquinone diglycidyl ether and having an epoxide content of 7.9 epoxide equivalents per kilogram are reacted with 23.8 grams of 2-amino-2-ethyl-1:3-propane-diol (molar ratio of epoxy-compound to amine=4:5) in a manner analogous to that described in Example 1. There is obtained a resin of which a solution of 60% strength in a mixture of ethanol and chloroform (1:1 by weight) has a viscosity of 2,000 centipoises.

*Example 6*

94 grams of a phthalic acid glycidyl ester ("Metallon K" of the firm Henkel), obtained by condensing phthalic acid with epichlorhydrin in the presence of an alkali, and having an epoxide content of 3.4 epoxide equivalents per kilogram, are reacted with 21 grams of 2-amino-2-methyl-1:3-propane-diol in a manner analogous to that described in Example 1. There is obtained a resin of which a solution of 60% strength in a mixture of ethanol and chloroform (1:1 by weight) has a viscosity of 2,400 centiposies.

*Example 7*

1000 grams of pharmaceutical sugar dragées of 8.5 to 8.8 millimeters diameter, which had been prepared in the usual manner with sugar syrup, were coated with a solution of 10% strength of the resinous amine addition product described in Example 1 in a mixture of ethanol and chloroform (1:1 by weight) in 40 cc. portions in the usual manner in a coating drum of corresponding size at a speed of rotation of about 40 revolutions per minute.

Immediately after the coating operation air at room temperature was passed over the dragées until the coatings did not stick. A total of about eight portions of the aforesaid solution were taken up during the procedure described above.

The dragées coated in the manner described above were to a great extent resistant to the atmosphere, but they had a somewhat matt appearance and in some cases a slightly roughened surface. They were therefore further treated with a polishing solution having the following composition:

| | Percent |
|---|---|
| Ethyl-cellulose | 5 |
| Amine-addition product of Example 1 | 10 |
| Silicone oil ("D.C. 200") | 0.05 |
| Mixture of alcohol and chloroform (1:1) to make _ | 100 |

The solution was applied in portions of 40 cc. as described above. Usually a twice repeated after-treatment suffices. It was continued until a distinct gloss appeared, which generally required 4 or 5 coats.

Dragées after-treated in the above manner, when stored in a moist atmosphere both at room temperature and a raised temperature (37° C.), were found to be considerably more resistant to the atmosphere than the sugar dragées not so treated. The ability of the coating to decompose in gastric juice was no different from that of the sugar dragées that had not been after-treated.

*Example 8*

1 gram of reserpine was worked up with 41.5 grams of lactose and 10 grams of starch to form a homogeneous powder, which was worked up into a granular binding agent in the usual manner with 5 grams of a hydrolyzed starch in the form of a paste.

The dry granulate was then worked up in a kneading apparatus with a solution of 30 grams of the resinous amine addition product described in Example 1 and 5 grams of polyvinyl acetate in 175 grams of a mixture of ethanol and chloroform (1:1) to form a homogeneous mass that was moist throughout. It was then broken up in the usual manner, dried and worked up to a prescribed particle size.

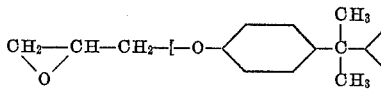 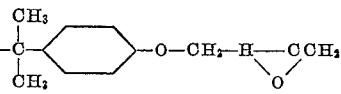

0.5 gram of magnesium stearate and 7 grams of talc were added to the granulate, and the mixture was compressed to tablets weighing 100 milligrams each and having a diameter of 6 millimeters. The reserpine tablets produced in this manner contained 1 milligram of active substance and, when tested in a moist atmosphere at 37° C., were found to be very resistant to decomposition. Tablets produced in this manner disintegrate in water only after a prolonged test period, whereas they disintegrate in artificial gastric juice at 37° C. in a few minutes.

What is claimed is:

1. A pharmaceutical preparation in dosage unit form adapted for oral administration which is insensitive to water and moisture and which disintegrates in gastric juice comprising an active medicament and comprising an addition product of a 1.2-epoxy-compound, which contains substantially 2-epoxide groups per mol, with a saturated aliphatic primary monoamine which contains at least two hydroxyl groups, and in which addition product 1.1–1.5 mols of the amine are combined per mol of the 1.2-epoxy compound.

2. A composition as claimed in claim 1, wherein the addition product is dissolved in a mixture of organic solvents including an alcohol.

3. A composition as claimed in claim 2, wherein the addition product is dissolved in a mixture of equal parts by weight of ethanol and chloroform.

4. A pharmaceutical preparation as claimed in claim 1 in which the addition product is a binder for the active medicament.

5. A pharmaceutical preparation as claimed in claim 4 in which the dosage unit form is a pill.

6. A pharmaceutical preparation as claimed in claim 4 in which the dosage unit form is a dragée.

7. A pharmaceutical preparation as claimed in claim 4 in which the dosage unit form is a tablet.

8. A pharmaceutical preparation as claimed in claim 1 in which the addition product is a coating for the active medicament.

9. A pharmaceutical preparation as claimed in claim 8 in which the dosage unit form is a dragée.

10. A pharmaceutical preparation as claimed in claim 8 in which the dosage unit form is a pill.

11. A pharmaceutical preparation as claimed in claim 8 in which the dosage unit form is a tablet.

12. A pharmaceutical preparation in dosage unit form adapted for oral administration which is insensitive to water and moisture and which disintegrates in gastric juice comprising an active medicament and comprising an addition product of a diglycidyl ether which substantially corresponds to the formula in which $n$ is a number from 0 to 2, with a saturated aliphatic primary monoamine which contains at least two hydroxyl groups, and in which addition product 1.1–1.5 mols of the amine are combined per mol of the diglycidyl ether.

13. A pharmaceutical preparation in dosage unit form adapted for oral administration which is insensitive to water and moisture and which disintegrates in gastric juice comprising an active medicament and comprising an addition product of a 1.2-epoxy-compound, which contains substantially 2 epoxide groups per mol, with a primary monoamine of the formula

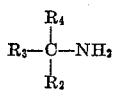

in which $R_2$ and $R_3$ each represents a hydroxyalkyl group containing 1–2 carbon atoms, and $R_4$ represents a member selected from the group consisting of an alkyl group containing 1–2 carbon atoms and a hydroxyalkyl group containing 1–2 carbon atoms, and in which addition product 1.1–1.5 mols of the amine are combined per mol of the 1.2-epoxy compound.

14. A composition as claimed in claim 13, which contains an addition product derived from 2-amino-2-methyl-propane-1:3-diol as the primary monoamine.

15. A composition as claimed in claim 13, which contains an addition product derived from 2-amino-2-ethyl-propane-1:3-diol as the primary monoamine.

References Cited in the file of this patent

UNITED STATES PATENTS

| | | |
|---|---|---|
| 2,723,241 | De Groote et al. | Nov. 8, 1955 |
| 2,753,323 | Fornham | July 3, 1956 |
| 2,816,062 | Doerr | Dec. 10, 1957 |
| 2,820,741 | Endicott et al. | Jan. 21, 1958 |
| 2,857,313 | Cooper | Oct. 21, 1958 |
| 2,868,767 | Cyba | Jan. 13, 1959 |
| 2,871,221 | Shepherd | Jan. 27, 1959 |
| 2,954,323 | Endicott et al. | Sept. 27, 1960 |

OTHER REFERENCES

Epon Resins, Shell Chem. Corp., December 1953, pp. 3 and 11.

Plastics in the Service of Man, Penguin Books Inc., Baltimore, Md., 1956, pp. 109, 114, 117, 168.

UNITED STATES PATENT OFFICE
CERTIFICATE OF CORRECTION

Patent No. 3,055,433                                September 25, 1962

Robert Hiltpold et al.

It is hereby certified that error appears in the above numbered patent requiring correction and that the said Letters Patent should read as corrected below.

Columns 5 and 6, lines 7 to 10, the right-hand portion of the formula reading

Signed and sealed this 19th day of May 1964.

(SEAL)
Attest:

ERNEST W. SWIDER                                     EDWARD J. BRENNER
Attesting Officer                                         Commissioner of Patents